(12) United States Patent
Lu

(10) Patent No.: US 7,903,046 B2
(45) Date of Patent: Mar. 8, 2011

(54) SIGNAL TRANSMITTER AND A DRIVING METHOD THEREOF

(75) Inventor: Chao-Hsin Lu, Tao-Yuan Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 945 days.

(21) Appl. No.: 10/907,705

(22) Filed: Apr. 12, 2005

(65) Prior Publication Data

US 2005/0232306 A1 Oct. 20, 2005

(30) Foreign Application Priority Data

Apr. 16, 2004 (TW) .............................. 93110674 A

(51) Int. Cl.
*G09G 5/00* (2006.01)
(52) U.S. Cl. ....................................................... 345/3.1
(58) Field of Classification Search .................. 345/204, 345/3.1; 370/490; 386/46; 348/476
See application file for complete search history.

(56) References Cited

U.S. PATENT DOCUMENTS

| 6,473,078 B1 * | 10/2002 | Ikonen et al. ................. 345/211 |
| 6,819,305 B2 * | 11/2004 | Wicker ........................... 345/3.1 |
| 2002/0149541 A1 * | 10/2002 | Shin ................................ 345/3.1 |
| 2003/0174156 A1 * | 9/2003 | Katsuhara et al. ............. 345/700 |
| 2005/0036758 A1 * | 2/2005 | Huang .............................. 386/46 |

OTHER PUBLICATIONS

"THS8135 Triple 10-Bit, 240 MSPS Video DAC With Tri-Level Sync and Video ( ITU-R.BT601)-Compliant Full Scale Range," SLAS343A, Jun. 2002, pp. 1-21, Texas Instruments Incorporated, Dallas, Texas.

* cited by examiner

*Primary Examiner* — Amr Awad
*Assistant Examiner* — Yong Sim
(74) *Attorney, Agent, or Firm* — Thomas, Kayden, Horstemeyer & Risley, LLP

(57) ABSTRACT

A transmitter includes an output module coupled to an output port for outputting an output signal to the output port according to a detection signal, and a detect module for detecting the output port to generate the detect signal.

20 Claims, 4 Drawing Sheets

SIGNAL TRANSMITTER AND A DRIVING METHOD THEREOF

BACKGROUND OF INVENTION

1. Field of the Invention

The present invention relates to signal output devices and, more particularly, to signal transmitters and driving methods thereof.

2. Description of the Prior Art

FIG. 1 is the block diagram of a prior art signal output device 10. The signal output device 10 comprises a signal transmitter 12 and a display device 14. The signal transmitter 12 comprises a signal processing circuit 16, an output circuit 18, and a connection port 20. The data processing circuit 16 decodes the signal DATA inputted to the signal processing circuit 16 and outputs an image signal DATA'. The output circuit 18 transforms the digital signal DATA' into an analog signal DATA", and the signal DATA" is transmitted to the display device 14 through the connection port 20 and a connecting line 22. The display device 14 then displays the image corresponding to the signal DATA".

If the signal transmitter 12 is not connected to the display device 14, the signal transmitter 12 is not able to drive the display device 14 when the signal transmitter is powered on because the connection between the signal transmitter 12 and the display device 14 is broken. However, the signal processing circuit 16 and the output circuit 18 begin to dissipate power when they are powered on, and this results in an unnecessary waste of power in the signal transmitter 12. If such a signal transmitter is used in portable electronic devices, such as a notebook, it will definitely shorten the time the battery is able to supply power.

SUMMARY OF INVENTION

It is one of the objectives of the present invention to provide a signal transmitter for determining whether or not to output a signal by detecting the connection of the load device and a driving method thereof.

According to the claimed invention, a signal transmitter is disclosed comprising an output module for determining whether to stop outputting an output signal to an output port according to a detect signal; and a detect module coupled to the output port for detecting the output port in order to generate the detect signal.

According to the claimed invention, a method is disclosed for controlling outputting an output signal, the method comprising determining whether to stop outputting an output signal according to a detect signal; and detecting the output port to generate the detect signal.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
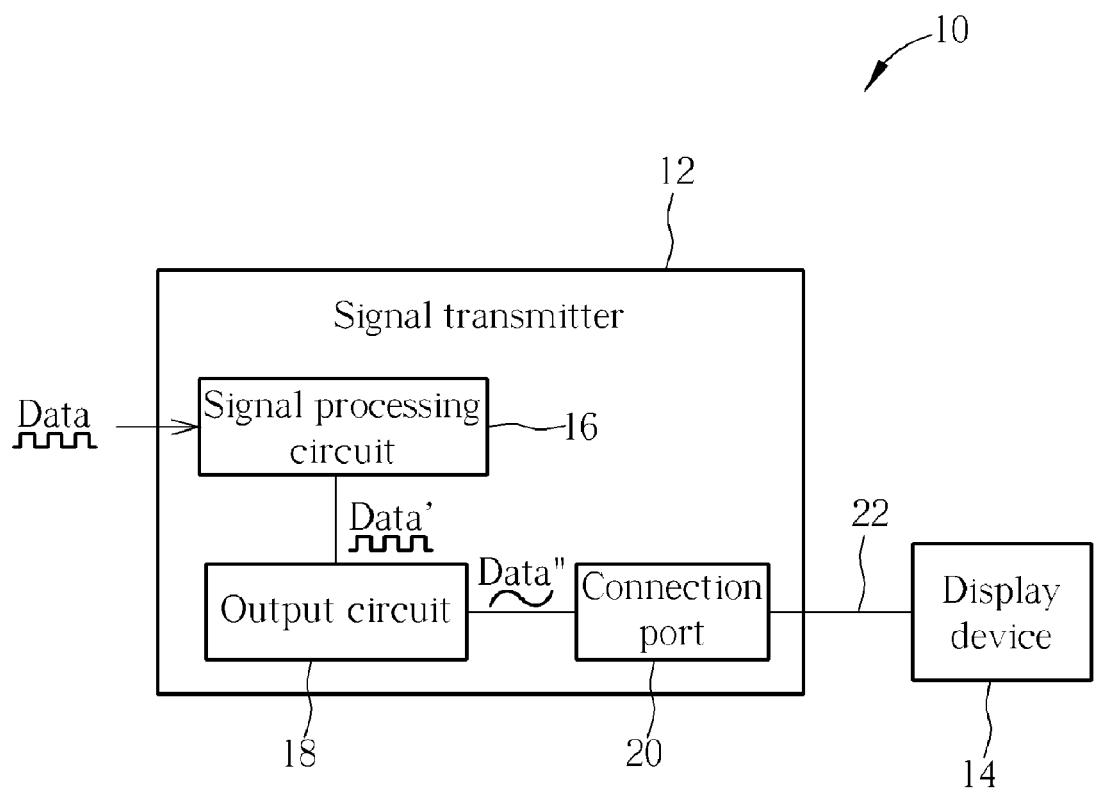
FIG. 1 is a block diagram of a prior art output device system.
Figure 2:
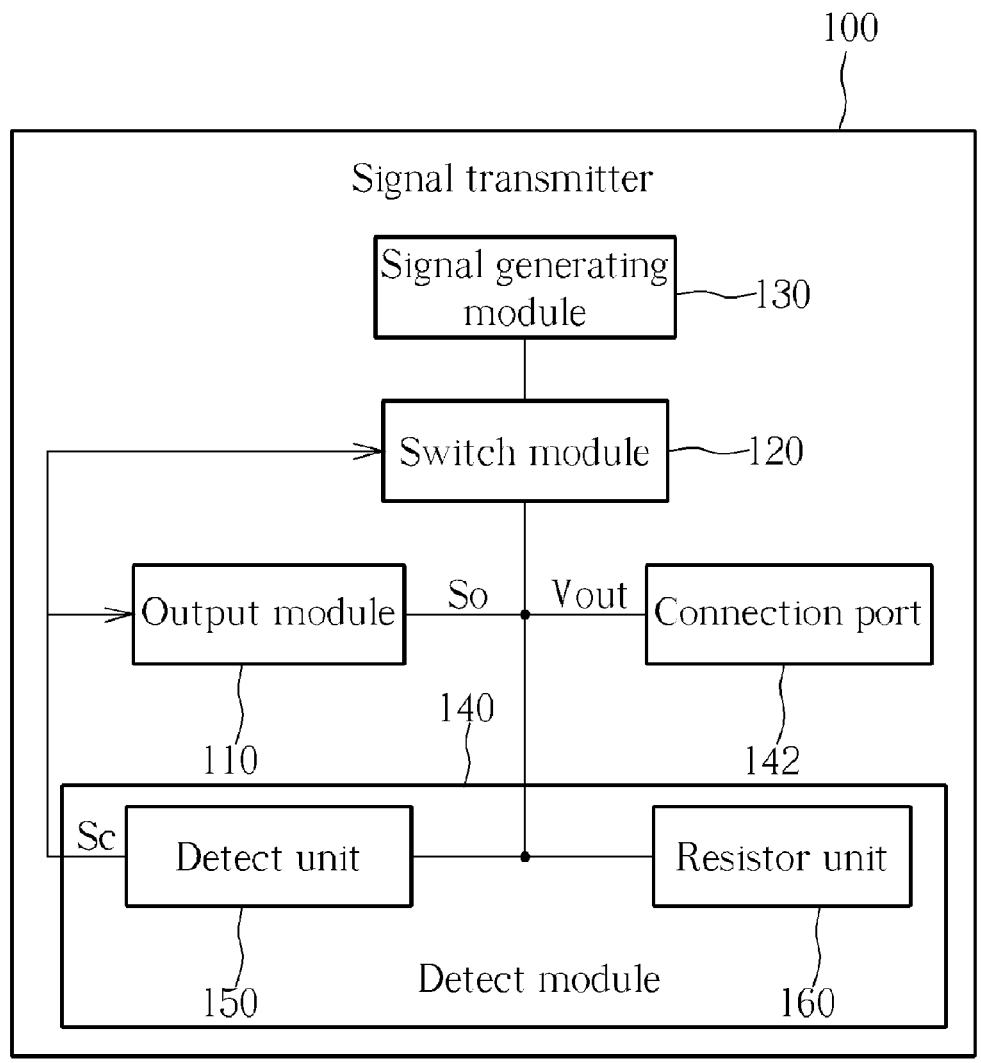
FIG. 2 is a block diagram of a signal transmitter according to the present invention.

FIG. 2 is a block diagram of a signal transmitter 100 according to the present invention. The signal transmitter 100 comprises an output module 110, a switch module 120, a signal generating module 130, a detect module 140, and a connection port 142. The detect module 140 comprises a detect unit 150 and a resistor unit 160. The signal transmitter 100 receives a working voltage when beginning to operate. The output module 110 is used for generating an output signal. The switch module 120 is intervened between the signal generating module 130 and the connection port 142. The signal generating module 130 is used for providing a current signal or a voltage signal. The detect module 140 is used for detecting whether the connection port 142 is connected to an external load. For example, if the signal transmitter 100 is a DVD player, the connection port 142 is connected to a display through a connecting line. For another example, if the signal transmitter 100 is an audio amplifier, the connection port 142 is connected to a speaker through the connecting line. Note that the signal transmitter 100 may be any device with an output port, or which outputs an output signal to another device.

Figure 3:
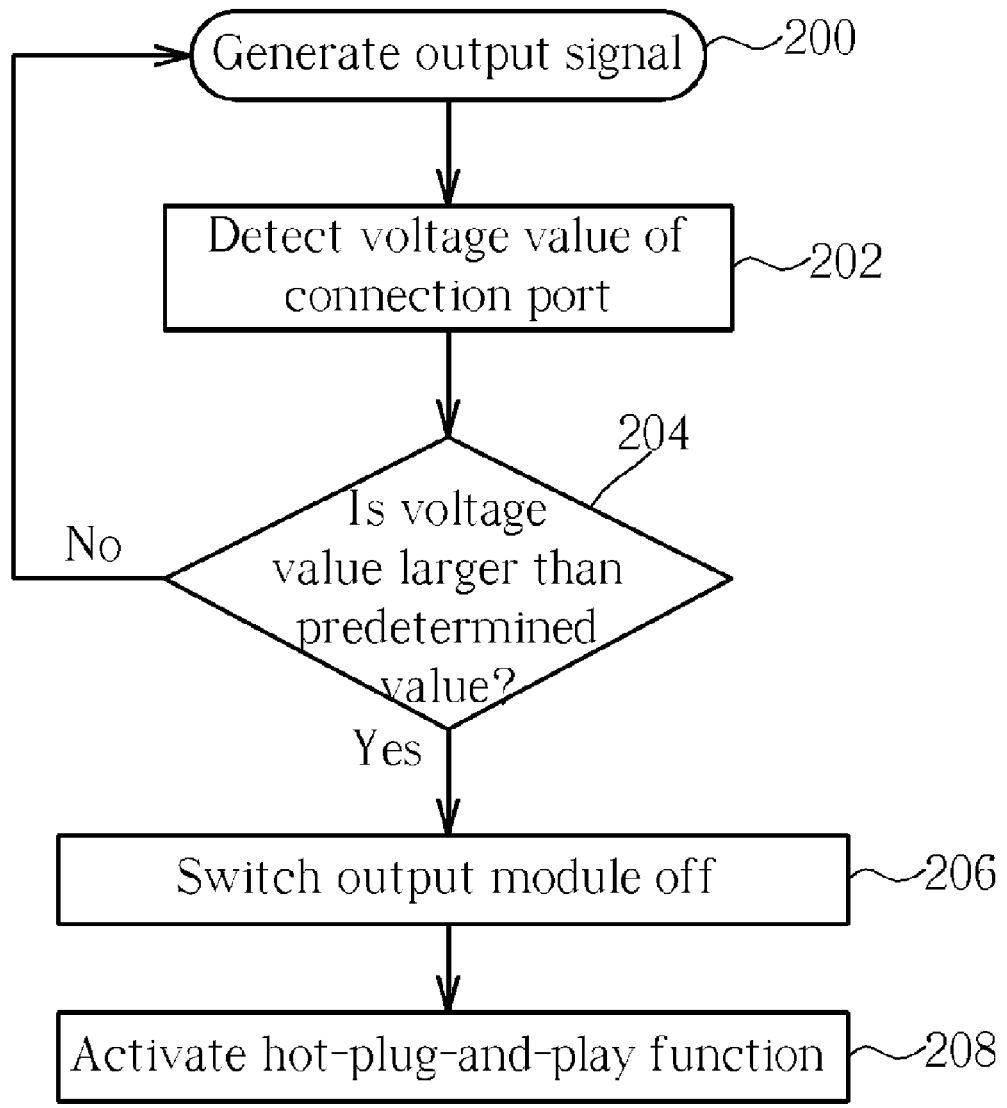
FIG. 3 is a flowchart of the signal transmitter of FIG. 2.

Please refer to FIG. 3. FIG. 3 is an operational flowchart of the signal transmitter in FIG. 2, and the signal transmitter works as follows:

Step 200: The output module 110 generates an output signal So;

Step 202: The detect module 140 detects the voltage value Vout of the connection port 142;

Step 204: The detect module 140 compares the voltage value Vout and a predetermined value. If the voltage value Vout is greater than the predetermined value, operation proceeds to step 206; otherwise, operation proceeds to step 200;

Step 206: The detect module 140 generates a control signal Sc to switch the output module 110 off;

Step 208: Activate the function of hot-plug-and-play. In another embodiment of the present invention, the signal transmitter 100 may stop operations and begin a stand-by mode (power-saving mode) while the input data DATA is still being inputted. When the detect module 140 detects that the connection port 142 is connected to the external load, the output module 110 is informed by the control signal Sc to switch to normal operation. In anther embodiment of the present invention, the control signal Sc may directly cut off the working voltage of the output module 110 so as to save power.

In this embodiment of the present invention, the output module 110 operates in current mode, meaning that the output module 110 is capable of generating an output signal So with a specific current value when the output module 110 is processing a predetermined signal (step 200). The detect unit 150 of the detect module 140 detects the voltage value of the connection port 142 (202). Additionally, the resistor unit 160 is used for assisting the detect module 150 to detect the connection status between the connection port 142 and the external load. The steps of the operation are described as follows.

Assume that the input resistance of the external load, such as a display, is 75-ohm, which is equal to the resistance of the resistor unit 160. When an external load is connected to the connection port 142 through a connecting line, if the resistance of the connecting line and the connection port 142 can be eliminated, the output resistance of the signal transmitter 100 is regarded as the parallel connection of the 75-ohm resistance and the resistor unit 160, meaning that the voltage value Vout detected by the detect unit 150 is equal to the product of the current value I of the output signal So and the equivalent resistance of the parallel connection of the 75-ohm resistance and the resistor unit 160, which is I*37.5. Conversely, if the external load is not connected to the connection port 142, the voltage value detected by the detect unit 150 will be I*75. Therefore, the detect module 140 determines whether the connection port 142 is connected to an external load according to the voltage value Vout detected. In this embodiment of the present invention, the detect module 150 compares the voltage value Vout with a predetermined value (such as I*56.25) so as to determine the connection status of the connection port 142 (step 204). If the voltage value Vout is greater than the predetermined value, the external load is not connected to the connection port 142 and the operation of the output module 110 will be stopped so as to save power (step 206). In another embodiment of the present invention, the control signal Sc of the detect module 150 may also be capable of controlling the operation of the switch module 120. Meanwhile, the switch module 142 is switched on in order to connect the signal generating module 130 to the connection port 142. In the present embodiment, the signal generating module 130 may generate an additional steady current Iss so that when the output module 110 stops generating the output signal So, a voltage value of Iss*75 is generated at the connection port 142 while the additional steady current Iss runs through the resistor unit 160. Thus the voltage of the connection port 142 is not zero although the operation of the output module 110 has been stopped. As long as the external load is connected to the connection port 142, another voltage value Iss*37.5 is generated at the connection port 142. Therefore the detect unit 150 outputs the control signal Sc to reactivate the output module 110, the switch module 142 is switched off, and the output module 110 outputs the output signal So to drive the display. Generally speaking, the signal generating module 130 is used for generating an output voltage at the connection port 142 when the output module 110 is switched off, and the signal transmitter 110 may thus have the function of hot-plug-and-play (step 208).

On the other hand, if the voltage value Vout is not greater than the predetermined value, meaning that the external load is connected to the connection port 142. In this situation, the output module 110 generates the output signal So to drive the display. Moreover, steps 200, 202, and 204 will keep detecting the connection between the external load and the signal transmitter 100.

In another embodiment of the present invention, the resistor unit 160 may comprises a plurality of resistor so as to form the value of resistance needed and the operation of the detect module 140 can be illustrated by an example of a signal transmitter 100 driving a display. The output signal is of the CVBS, S-Video, YPbPr or RGB specification. The signal transmitter 100 may also drive other kinds of loads (such as a speaker). Accordingly, the resistance value of the resistor unit 160 depends on the external load and the detect module 140 uses an appropriate predetermined value in step 204. In other words, the signal transmitter 100 may detect the connection status through appropriately arranged detect module 140 in different situations.

Figure 4:
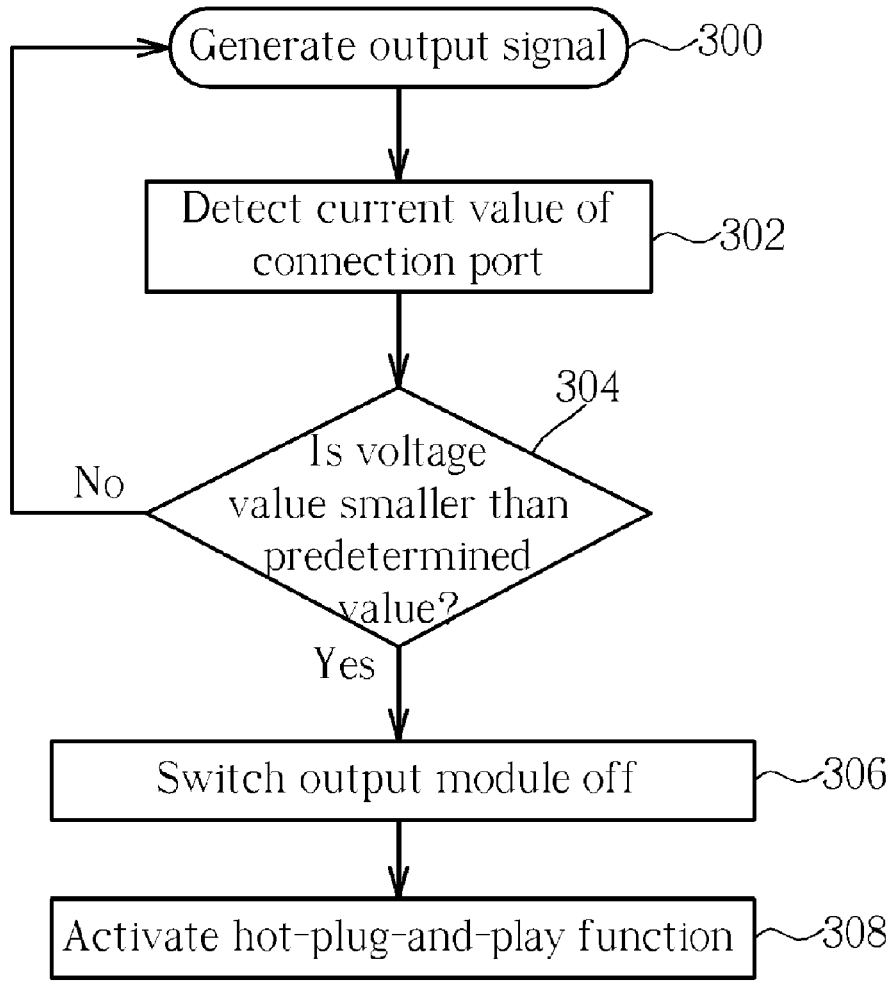
FIG. 4 is another flowchart of the signal transmitter of FIG. 2.

In another embodiment of the present invention, the output module 110 may operate in voltage mode. When the output module 110 is processing a signal so as to generate an output signal So, the output signal So corresponds to a voltage value, meaning that different signals processed by the output module 110 results in the corresponding output signal So of different voltage values. Meanwhile, the detect module 140 of the present invention detects the connection status of an external connecting line. Please refer to FIG. 4. FIG. 4 is another operational flowchart of the signal transmitter 100 in FIG. 2, and the operation comprises the following steps:

Step 300: The output module 110 generates an output signal So.

Step 302: The detect module 140 detects the current value Iout of the connection port 142.

Step 304: The detect module 140 compares the current value Iout and a predetermined value, if the current value Iout is less than the predetermined value, operation proceeds to step 306; otherwise, operation proceeds to step 300.

Step 306: The detect module 140 generates a control signal Sc to switch off the output module 110.

Step 308: Activate the function of hot-plug-and-play.

The output module 110 may generate an output signal of a specific voltage value V when it processes a signal (step 300). The detect unit 150 of the detect module 140 detects the current value Iout at the connection port 142 (step 302), and the resistor unit 160 is also used for assisting the detect unit 150 to determine the connection status between the connection port 142 and the external load. The operation is illustrated as follows.

If the external load of the signal transmitter 100 is a display, when the display is connected to the connection port 142, the output resistance of the signal transmitter 100 may be regarded as a parallel connection of a 75-ohm resistor and the resistor unit 160, wherein the resistance value of the resistor unit 160 is 75-ohm. In other words, the current value detected by the detect unit 150 is V/37.5. Conversely, when the display is not connected to the connection port 142, the output resistance of the signal transmitter 100 is the resistance value of the resistor unit 160, meaning that the current value Iout detected by the detect unit 150 is equal to V/75.

Therefore, the detect unit 150 determines whether the connection port 142 is connected to an external load according to the current value Iout. In this embodiment, the detect unit 150 compares the current value Iout with a predetermined value (such as V/56.25) to determine the connection status of the connection port 142 (step 304). If the current value Iout is smaller than the predetermined value, the display is not connected to the connection port 142 so the detect unit 150 will output the control signal Sc to stop the operation of the output module 110 so as to save power (step 306). When the display is not connected to the connection port 142, the output module 110 enters power-saving mode either actively or passively.

On the contrary, if the current value Iout is not less than the predetermined value, the display is connected to the connection port 142 of the signal transmitter 100 through a connecting line.

From the above two exemplary embodiments, whether the output module 110 operates in current mode or voltage mode, the detect module 140 is capable of determining whether the connection port 142 is connected to an external load, and thus the performance of the signal transmitter 100 is greatly improved.

Those skilled in the art will readily observe that numerous modifications and alterations of the device may be made while retaining the teachings of the invention. Accordingly, the above disclosure should be construed as limited only by the metes and bounds of the appended claims.

What is claimed is:
1. A transmitter comprising:
   an output module of the transmitter to output an output signal to an output port of the transmitter and stop outputting the output signal to the output port according to a detect signal;

a detect module of the transmitter, coupled to the output port, to detect the output port to generate the detect signal;

a signal generating module of the transmitter for generating a connection signal, wherein the connection signal indicates a connection status with an external load at the output port; and a switch module of the transmitter, coupled between the signal generating module and the output port, for selectively transmitting the connection signal to the output port, wherein the switch module is switched on to transmit the connection signal to the output port when the output module stops outputting the output signal.

2. The transmitter of claim 1, wherein the detect module comprises:

a resistor unit; and a detect unit coupled to the resistor unit for detecting a detect value generated when the output signal is inputted to the resistor unit.

3. The transmitter of claim 1, wherein the output signal corresponds to a predetermined current value, and the detect module detects a voltage value of the output port.

4. The transmitter of claim 1, wherein the output signal corresponds to a predetermined voltage value, and the detect module detects a current value of the output port.

5. The transmitter of claim 1, wherein the output signal is compliant with one of the CVBS, S-Video, YPbPr, or RGB specification.

6. The transmitter of claim 1, wherein when the output module stops outputting the output signal, the signal generating module generates the connection signal to thereby activate a function of hot-plug-and-play.

7. The transmitter of claim 1, wherein the output signal comprises a video signal.

8. The transmitter of claim 1, wherein the output signal comprises an audio signal.

9. The transmitter of claim 1, wherein the detect module generates the detect signal according to a detect value presented at the output port of the transmitter due to the output signal generated from the output module within the transmitter to the output port.

10. The transmitter of claim 3, wherein the output module stops outputting the output signal if the voltage value of the output port is greater than a predetermined value.

11. The transmitter of claim 4, wherein the output module stops outputting the output signal if the current value is smaller than a predetermined value.

12. A method for outputting an output signal of a transmitter having a switch module included therein, the method, comprising:

outputting the output signal to an output port of the transmitter;

detecting the output port to generate a detect signal;

determining whether to stop outputting the output signal according to the detect signal;

generating a connection signal, wherein the connection signal indicates a connection status with an external load at the output port; and utilizing the switch module of the transmitter to selectively transmit the connection signal to the output port of the transmitter, wherein the switch module is switched on to transmit the connection signal to the output port when the output signal is not outputted to the output port.

13. The method of claim 12, wherein the output signal corresponds to a predetermined current value, and the detect signal of the output port is a voltage value.

14. The method of claim 12, wherein the output signal corresponds to a predetermined voltage value, and the detect signal of the output port is a current value.

15. The method of claim 12, wherein the output signal comprises a video signal.

16. The method of claim 12, wherein the output signal comprises an audio signal.

17. The method of claim 12, wherein generating the connection signal comprises:

when the output signal is not outputted to the output port, generating the connection signal to thereby activate a function of hot-plug-and-play.

18. The method of claim 12, wherein outputting the output signal to the output port comprises utilizing an output module within the transmitter to generate the output signal to the output port of the transmitter; and detecting the output port to generate the detect signal comprises generating the detect signal according to a detect value presented at the output port due to the output signal generated from the output module within the transmitter to the output port.

19. The method of claim 13, further comprising:

stopping outputting the output signal if the voltage value is greater than a predetermined value.

20. The method of claim 14, further comprising:

stopping outputting the output signal if the current value is smaller than a predetermined value.

* * * * *